(12) United States Patent
Sorstedt

(10) Patent No.: US 9,965,699 B2
(45) Date of Patent: May 8, 2018

(54) METHODS AND SYSTEMS FOR ENABLING IMPROVED POSITIONING OF A VEHICLE

(71) Applicant: VOLVO CAR CORPORATION, Gothenburg (SE)

(72) Inventor: Joakim Sorstedt, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 208 days.

(21) Appl. No.: 14/921,367

(22) Filed: Oct. 23, 2015

(65) Prior Publication Data

US 2016/0125608 A1    May 5, 2016

(30) Foreign Application Priority Data

Nov. 4, 2014   (EP) ..................................... 1419585

(51) Int. Cl.
  *G06T 7/60*  (2017.01)
  *G06K 9/52*  (2006.01)
  (Continued)

(52) U.S. Cl.
  CPC ............. *G06K 9/6201* (2013.01); *B60R 1/00* (2013.01); *G01C 21/32* (2013.01);
  (Continued)

(58) Field of Classification Search
  None
  See application file for complete search history.

(56) References Cited

U.S. PATENT DOCUMENTS 5,109,425 A * 4/1992 Lawton .................. G06T 7/262
                                                           348/25
6,820,897 B2 * 11/2004 Breed .................. B60R 21/015
                                                           280/735
(Continued)

FOREIGN PATENT DOCUMENTS

| EP | 0782118 | 7/1997 |
| WO | 2009098154 | 8/2009 |
| WO | 2013149149 | 10/2013 |

OTHER PUBLICATIONS

Extended European Search Report for European Application No. EP 14191585.0, Compelted by the European Patent Office, dated Apr. 30, 2015, 7 Pages.

*Primary Examiner* — Reza Aghevli
(74) *Attorney, Agent, or Firm* — Brooks Kushman P.C.

(57) ABSTRACT

A method performed by an object size mapping system is described for enabling improved positioning of a vehicle. The object size mapping system includes a first reference camera adapted to be arranged on-board a reference vehicle. The object size mapping system determines a current reference position of the reference vehicle. The system captures by the first reference camera, at the current reference position of the reference vehicle, a current reference image of a stationary physical reference object situated in the surroundings of the reference vehicle. The object size mapping system then determines a current reference size value of at least a portion of the stationary physical reference object, in the current reference image. The object size mapping system stores the current reference size value to be associated with the current reference position of the reference vehicle and a mapped digital reference object corresponding to the stationary physical reference object.

16 Claims, 7 Drawing Sheets

(51) Int. Cl.
*G06K 9/00* (2006.01)
*G01S 5/16* (2006.01)
*G01S 19/48* (2010.01)
*G01C 21/32* (2006.01)
*G06K 9/62* (2006.01)
*B60R 1/00* (2006.01)
*G01C 21/36* (2006.01)

(52) U.S. Cl.
CPC ............ *G01C 21/3602* (2013.01); *G01S 5/16* (2013.01); *G01S 19/48* (2013.01); *G06K 9/00791* (2013.01); *G06K 9/52* (2013.01); *G06T 7/60* (2013.01); *G06T 2207/30252* (2013.01)

(56) References Cited

U.S. PATENT DOCUMENTS

| | | | |
|---|---|---|---|
| 9,460,624 B2* | 10/2016 | Pandita | G08G 1/16 |
| 2009/0228204 A1* | 9/2009 | Zavoli | G01C 21/30 |
| | | | 701/532 |
| 2010/0166256 A1* | 7/2010 | Kmiecik | G01C 11/06 |
| | | | 382/103 |
| 2012/0310516 A1* | 12/2012 | Zeng | G01C 21/32 |
| | | | 701/300 |
| 2015/0363653 A1* | 12/2015 | Kashiwai | G06K 9/00791 |
| | | | 348/148 |

* cited by examiner

| 151, 1511 Mapped digital (reference) object | |
|---|---|
| Vehicle position | Reference size value |
| $x_1, y_1$ | $z_1$ |
| $x_2, y_2$ | $z_2$ |
| ... | ... |
| $x_n, y_n$ | $z_n$ |

Fig. 3

METHODS AND SYSTEMS FOR ENABLING IMPROVED POSITIONING OF A VEHICLE

CROSS-REFERENCE TO RELATED APPLICATIONS

This application claims foreign priority benefits under 35 U.S.C. § 119(a)-(d) to European patent number EP 14191585.0, filed Nov. 4, 2014, which is incorporated by reference in its entirety.

TECHNICAL FIELD

The present disclosure relates to systems and methods performed therein, for enabling improved positioning of a vehicle.

BACKGROUND

In recent years, development of autonomous vehicles has been, and increasingly is, growing rapidly. The concept of autonomous driving relates to that the vehicle, at least to some extent, is driven without human interaction. That is, the vehicle may have an automation level of e.g. 0%<automation level≤100%, wherein 0% may represent that the vehicle is driven by a driver only, and 100% that the vehicle is driven completely autonomously. When having an automation level anywhere between 0% and 100%, the vehicle may autonomously perform some actions, as e.g. keeping a suitable distance to the vehicle ahead, while the driver may perform other actions, as e.g. overtaking another vehicle when appropriate. The closer to 100%, the more actions are performed autonomously by the vehicle.

Autonomous vehicles, also commonly known as autonomously driven vehicles, driverless vehicles, self-driving vehicles, or robot vehicles, are known to sense their surrounding with such techniques as e.g. radar, lidar, GPS and/or computer vision. Advanced control systems may interpret sensory information to identify appropriate paths, as well as obstacles. For instance, an autonomous vehicle may update its map based on sensory input, allowing the vehicle to keep track of its position even when conditions change or when it enters uncharted environments.

Naturally, accurate positioning is important for autonomous vehicle applications. Both the vehicle's lateral position, i.e. the current lane and/or the lateral distance to lane markings, as well as the vehicle's longitudinal position, is required. However, vehicle positioning given by e.g. cost effective GNSS sensors, such as GPS, commonly do not provide vehicle positioning considered satisfyingly accurate or reliable. To reach a satisfying level of vehicle positioning accuracy, data from multiple sensors may need to be combined. For instance, a lateral distance from the vehicle to the lane markings may be possible to estimate by utilizing a vision sensor. However, estimating in which lane the vehicle is positioned and/or the longitudinal position of the vehicle may be much harder, especially when being restricted to utilizing cost effective sensors.

WO 2013/149149, for instance, relates to identifying a driven lane on a map and to improve a vehicle position estimate. There is suggested estimating a location of the vehicle using a global navigation satellite system, and determining a closest mapped road to the estimated location of the vehicle. Furthermore, there is suggested that light detection and ranging (lidar) and camera systems are used in detection of, or ranging to, distinct features in the environment and that for vehicle positioning, the sensors may be used to detect street signs, buildings, or lane markings in the immediate vicinity of the vehicle.

However, although WO 2013/149149 discloses a solution enabling refining of the estimated position of the vehicle, the challenge of providing a vehicle position estimate with high accuracy, remains.

SUMMARY

It is therefore an object of certain exemplary embodiments herein to provide an approach supporting improved vehicle positioning.

According to one embodiment, the object is achieved by a method performed by an object size mapping system for enabling improved positioning of a vehicle. The object size mapping system comprises at least a first reference camera adapted to be arranged on-board a reference vehicle. The object size mapping system determines a current reference position of the reference vehicle. Furthermore, the object size mapping system captures by means of the at least first reference camera, at the current reference position of the reference vehicle, a current reference image of a stationary physical reference object situated in the surroundings of the reference vehicle. The object size mapping system then determines a current reference size value of at least a portion of the stationary physical reference object, in the current reference image. Moreover, the object size mapping system stores the current reference size value to be associated with the current reference position of the reference vehicle and associated with a mapped digital reference object corresponding to the stationary physical reference object.

Thereby, there is introduced an approach according to which a subsequent longitudinal and/or lane vehicle positioning may be improved for a vehicle, in that a reference size of a stationary physical reference object in an image captured by a reference camera on-board e.g. a cartography vehicle, is stored to be associated with a reference position at which the cartography vehicle was positioned when the image was captured, and further associated with a mapped digital reference object corresponding to the physical reference object. Accordingly, a specific mapped digital reference object may be associated with a specific vehicle position and a reference size value relevant for that specific position. For that reason, an approach supporting improved vehicle positioning is provided. The technical features and corresponding advantages of the above mentioned method will be discussed in further detail in the following.

By introducing a method performed by an object size mapping system for enabling improved positioning of a vehicle, for instance on a reference digital map, an approach is provided which enables a position of the vehicle to be estimated with greater accuracy. The word "vehicle" may refer to any arbitrary vehicle, such as an autonomous vehicle, and may furthermore for instance refer to an engine-propelled vehicle, such as car, truck, lorry, van, bus, motorcycle, scooter, tractor, golf cart, military vehicle, vessel, boat etc., a rail-bound vehicle, such as e.g. a train or tram, or a bicycle. The vehicle may further comprise, or have on-board, a commonly known positioning system, such as a global positioning system, navigation system or the like. Moreover, the expression "digital map" may refer to a digital map comprising digital map data, as commonly known in the art, and the position of the vehicle may be mapped onto the digital map.

The object size mapping system may, for instance, be at least partly comprised in a reference vehicle, which reference vehicle may be configured for acquiring detailed map data with support from techniques known in the art. The word "reference vehicle" may refer to any arbitrary vehicle, such as a commonly known cartography vehicle, and may furthermore for instance refer to an engine-propelled vehicle, such as car, truck, lorry, van, bus, motorcycle, scooter, tractor, golf cart, military vehicle, vessel, boat etc., a rail-bound vehicle, such as e.g. a train or tram, or a bicycle.

Additionally or alternatively, the object size mapping system may be distributed, such that at least a portion of the object size mapping system, such as one or more memories thereof, may be arranged remotely from the reference vehicle, for instance in one or more databases, such as map data databases, and/or servers. In order to access the optional remotely arranged portions of the object size mapping system, the reference vehicle may be adapted to have online abilities, for instance by supporting Wifi functionality, or by being adapted to be in radio communication with a radio communications network, such as cellular communications network, e.g. LTE, EDGE, CDMA, 4G, 3G, GPRS, or GSM, e.g. via an infotainment system of the reference vehicle, and/or via a mobile user device on-board the reference vehicle, which is in communication with the reference vehicle.

Since the object size mapping system comprises at least a first reference camera adapted to be arranged on-board a reference vehicle, one or more cameras are configured to, for instance, be comprised in or be mounted on the reference vehicle. The reference camera(s) may be arbitrarily arranged throughout the reference vehicle, for instance arranged in a protected position supporting a substantially clear view, such that a clear view of the surroundings of the reference vehicle, may be provided. For instance, the reference camera (s) may be arranged behind the windscreen in the vicinity of, or embedded with, the rear view mirror. Moreover, the one or more reference cameras, which may refer to one or more mono cameras, may be adapted to support vision sensing. The expression "reference" camera refers to a camera comprised in the object size mapping system.

Since the object size mapping system determines a current reference position of the reference vehicle, for instance on a reference digital map, a prevailing reference position of the reference vehicle is established. The reference position of the reference vehicle, which for instance is expressed based on global coordinates, based on a longitudinal positioning along e.g. a road, and/or based on a relative position, may be determined repeatedly, continuously, intermittently or on request, for instance as the reference vehicle travels along an arbitrary and/or selected road. The reference position may be determined in any arbitrary manner, for instance by means of the object size mapping system determining said position with support from one or more devices adapted for providing high-resolution positioning. The one or more devices adapted for providing high-resolution positioning, which may be comprised in and/or be on-board the reference vehicle, and which may be commonly known, may refer to a laser scanning system for 3-dimensional data acquisition, and/or a global positioning system etc. Furthermore, the reference position may further be determined based on additional input from the at least first reference camera. Moreover, "determining" may, for instance, refer to establishing, retrieving, fetching, deriving, receiving, reading, requesting and/or learning of. The expression "current reference position" may, for instance, refer to "prevailing reference position", "reference position at a current or prevailing point of time", and/or "reference position at an essentially current or essentially prevailing point of time". Moreover, "current reference position" may likewise include "essentially current reference position". The expression "reference" position may refers to a position of the reference vehicle, whereas the expression "reference" digital map refers to a digital map utilized by, associated with, and/or comprised in, the object size mapping system.

Since the object size mapping system captures, by means of the at least first reference camera, at the current reference position of the reference vehicle, a current reference image of a stationary physical reference object situated in the surroundings of the reference vehicle, an image of a stationary object in view of the one or more reference cameras is detected, while the reference vehicle is positioned at, or essentially at, the determined current reference position. The at least first reference camera may capture, for instance detect, the reference image of the stationary physical reference object in any arbitrary known manner. The reference image may for instance be 2-dimensional, and further be considered a still or static image, or an essentially still or static image. The "stationary physical reference object" may refer to any arbitrary stationary physical object of arbitrary shape and/or size, such as for instance at least a portion of a traffic sign, building, land mark etc. Moreover, the expression of the stationary physical reference object being "situated in the surroundings of the reference vehicle", may refer to the stationary physical reference object being "detectable by the at least first reference camera", "in view of the at least first reference camera" and/or "in the vicinity of the reference vehicle". The expression "current" reference image refers to a reference image captured when the reference vehicle was determined to be positioned at, or essentially at, the current reference position. Moreover, the expression "reference" image refers to an image captured by the one or more reference cameras, whereas the expression stationary physical "reference" object may refer to a stationary physical object which is captured in an image by the one or more reference cameras.

Since the object size mapping system then determines a current reference size value of at least portion of the stationary physical reference object, in the current reference image, a size of the physical reference object in the reference image captured while the reference vehicle was at, or essentially at, the determined current reference position, is established. The closer the reference vehicle, and subsequently the at least first reference camera, is positioned relative the physical reference object, the larger is the size value of the physical reference object in the reference image. Accordingly, the reference size value is pertinent the position of the reference vehicle, i.e. the size value depends on the relative distance between the reference position and the physical reference object. The reference size value, which for instance may be expressed in pixels, may refer to a measure in at least a first dimension of the physical reference object in the captured reference image. The at least first dimension may for instance refer to a 2-dimensional direction, whereby a measure of for instance a height or a width of at least a portion of the physical reference object in the reference image, may be determined. "A current reference size value of at least a portion of the stationary physical reference object in at least a first dimension of the stationary physical reference object" may refer to "a current reference size value of at least a portion of the stationary physical reference object in at least a first 2-dimensional direction of the stationary physical reference object", and/or "a current reference height or a current reference width of at least a portion of the stationary physical reference object". "At least a portion" of the physical reference object may for instance refer to the sign portion of the physical reference object, excluding the pole, should the physical reference object be represented by a traffic sign. The expression "current" reference size value may, for instance, refer to a reference size value derived from the current reference image, which current reference image was captured while the reference vehicle was positioned at, or essentially at, the current reference position. Moreover, the expression "reference" size value refers to a size value of the physical reference object in the reference image. "Determining" may in this context likewise refer to "measuring", "calculating" and/or "establishing".

Since the object size mapping system stores, for instance in association with the reference digital map, the current reference size value to be associated with the current reference position of the reference vehicle, and to be associated with a mapped digital reference object corresponding to the stationary physical reference object, the current reference size value may be linked with the determined reference position at which the vehicle was determined to be positioned, or essentially positioned, when the reference image was captured, and furthermore linked with a mapped digital object determined to correspond to the physical reference object. Thereby, a specific reference size value pertinent the current reference position and pertinent the physical reference object, for instance a specific reference size value pertinent a relative distance between the current reference position and the physical reference object, may be stored in association with said current reference position and in association with a mapped digital reference object corresponding to the stationary physical reference object. Accordingly, a specific mapped digital reference object may be associated with a specific vehicle position and a reference size value relevant for that specific position. Subsequently, should the actions described in the foregoing be repeated continuously or intermittently as the reference vehicle for instance travels along an arbitrary or selected e.g. road, that is, should a plurality of reference positions of the reference vehicle be determined, a plurality of reference images of a stationary physical reference object be captured, and a plurality of reference size values be determined, then a specific mapped digital reference object may, for different reference positions of the reference vehicle, be stored to be associated with different reference size values which respectively are pertinent the respective reference positions. "Storing" may likewise refer to "saving" and/or "adding".

The current reference size value, the current reference positon, and one or more attributes and/or characteristics of the corresponding mapped digital reference object, may for instance be stored in one or more memories of the object size mapping system locally arranged in the reference vehicle and/or remotely arranged therefrom, for instance a reference table thereof. The reference table may, for instance, be comprised in the reference digital map, and/or comprised in reference map data of the reference digital map. Moreover, "mapped digital (reference) object" may throughout this disclosure relate to a digital map data object matching, reflecting and/or representing a corresponding physical object. That is, once e.g. a physical object, and subsequently its characteristics and/or attributes, have been acquired and stored, for instance in the digital map, it may throughout this disclosure be referred to as a "mapped digital object". The expression of a mapped digital reference object "corresponding" to the stationary physical reference object, may refer to a mapped digital object determined, considered, judged and/or assumed to match the stationary physical reference object. Moreover, the expression mapped digital "reference" object may refer to a mapped digital object determined to correspond to the detected stationary physical reference object.

According to another embodiment, the object size mapping system may further store the current reference size value to be associated with a mapped position of the mapped digital reference object, for instance on the reference digital map. Thereby, a mapped position indicating the position of the stationary physical reference object to which the mapped digital reference object is determined to correspond, may be stored to be associated with the current reference size value and the current reference position. That is, the current reference size value may be linked with the determined position of the reference vehicle at which the reference vehicle was positioned, or essentially positioned, when the reference image was captured, and furthermore linked with a mapped position of the mapped digital object determined to correspond to the physical reference object. Thereby, a specific reference size value pertinent the current reference position of the reference vehicle and pertinent a position of the physical reference object, i.e. a specific reference size value pertinent a relative distance between the current reference position and the position of the physical reference object, may be stored in association with said current reference position and in association with said mapped position which reflects the position of the stationary physical reference object.

Accordingly, a mapped position of a specific mapped digital reference object, which mapped position reflects the position of the stationary physical reference object, may be associated with a specific reference vehicle position and a reference size value relevant for that specific position. Subsequently, should the actions described in the foregoing be repeated continuously or intermittently as the reference vehicle for instance travels along an arbitrary or selected e.g. road, that is, should a plurality of reference positions of the reference vehicle be determined, a plurality of reference images of a stationary physical reference object be captured, and a plurality of reference size values be determined, then a mapped position of a specific mapped digital reference object may, for different reference positions of the reference vehicle, be associated with different reference size values which respectively are pertinent the respective reference positions. The mapped position may, for instance, be expressed based on global coordinates. Additionally or alternatively, the mapped position may be expressed based on a longitudinal positioning along e.g. a road, and/or based on a relative position.

According to another embodiment, the object size mapping system may further identify the mapped digital reference object, on a reference digital map. Thereby, the mapped digital reference object considered to correspond to the physical reference object, i.e. the mapped digital reference object judged to match the physical reference object, is identified among pre-stored mapped digital reference objects of the reference digital map. Identifying the mapped digital reference object may be accomplished with support from techniques known in the art, such as by utilizing GNSS and/or GPS positioning, in combination with e.g. a laser scanning system for 3-dimensional data acquisition, and comparing characteristics and/or attributes of the detected stationary physical reference object with mapped characteristics and/or attributes of mapped digital objects. "Identifying a mapped digital reference object" may refer to "identifying a matching mapped digital reference object", and/or "finding, determining, selecting and/or establishing a matching mapped digital reference object".

Additionally or alternatively, the object size mapping system may further map the stationary physical reference object to the reference digital map. Thereby, characteristics and/or attributes of the stationary physical reference object may be mapped to the reference digital map, thus resulting in the creation of a corresponding mapped digital reference object. Said mapping may take place subsequent detecting the physical reference object, for instance subsequent capturing the reference image of the physical reference object. Mapping of the stationary physical reference object to the reference digital map may be accomplished with support from techniques commonly known in the art.

According to another embodiment, the object is achieved by an object size mapping system for enabling improved positioning of a vehicle, for instance on a digital map The object size mapping system comprises at least a first reference camera adapted to be arranged on-board a reference vehicle. The object size determining system further comprises a reference positioning unit adapted for determining a current reference position of the reference vehicle, for instance on a reference digital map. Moreover the object size determining system comprises a reference image capturing unit adapted for capturing, by means of the at least first reference camera, at the current reference position of the reference vehicle, a current reference image of a stationary physical reference object situated in the surroundings of the reference vehicle. The object size determining system further comprises a reference size determining unit adapted for determining a current reference size value of at least a portion of the stationary physical reference object, in the current reference image, for instance in at least a first dimension of the stationary physical reference object in the current reference image. Furthermore, the object size determining system comprises a reference storing unit adapted for storing, for instance in association with the reference digital map, the current reference size value to be associated with: the current reference position of the reference vehicle; and a mapped digital reference object, for instance on the reference digital map, corresponding to the stationary physical reference object.

According to another embodiment, the reference storing unit may further be adapted for storing the current reference size value to be associated with a mapped position of the mapped digital reference object, for instance on the reference digital map. According to another embodiment, the object size mapping system may further comprise a reference identifying unit adapted for identifying the mapped digital reference object on a reference digital map. Additionally or alternatively, the object size mapping system may further comprise a mapping unit adapted for mapping the stationary physical object, for instance characteristics and/or attributes thereof, to the reference digital map.

Similar advantages as those mentioned in the foregoing in relation to the first embodiment correspondingly apply to the second, so these advantages are not further discussed.

According to another embodiment, the object is achieved by a vehicle positioning system for enabling improved positioning of a vehicle. The vehicle positioning system comprises at least a first camera adapted to be arranged on-board the vehicle, which at least first camera comprises predetermined characteristics. The vehicle positioning system estimates a current position of the vehicle. The vehicle positioning system furthermore captures, by means of the at least first camera, at the current position of the vehicle, a current image of a stationary physical object situated in the surroundings of the vehicle. The vehicle positioning system then identifies a pre-stored mapped digital object to correspond to the stationary physical object. Moreover, the vehicle positioning system determines a current size value of at least a portion of the stationary physical object, in the image. Furthermore, the vehicle positioning system compares the current size value to a pre-stored reference size value of a reference image pre-captured by at least a first reference camera comprising the predetermined characteristics, which reference size value is associated with the current vehicle position and the mapped digital object. The vehicle positioning system then re-evaluates the estimated current position of the vehicle based on an outcome of the comparison of the current size value to the reference size value.

Thereby, there is introduced an approach according to which longitudinal and/or lane vehicle positioning may be improved, in that a size of a stationary physical object in an image captured by a camera on-board a vehicle, is compared to a pre-stored expected size, and the outcome of the comparison is utilized for the establishment of an accurate or essentially accurate vehicle position, or for the re-consideration of a former estimated vehicle position. For that reason, an approach supporting improved vehicle positioning is provided. The technical features and corresponding advantages of the above mentioned method will be discussed in further detail in the following.

By introducing a method performed by a vehicle positioning system for enabling improved positioning of a vehicle, for instance on a digital map, an approach is provided which enables a position of the vehicle to be estimated with greater accuracy. The vehicle positioning system may, for instance, be at least partly comprised in the vehicle. Additionally or alternatively, the vehicle positioning system may be distributed, such that at least a portion of the vehicle positioning system, such as one or more memories thereof, may be arranged remotely from the vehicle, for instance in one or more databases, such as map data databases, and/or servers. In order to access the optional remotely arranged portions of the vehicle positioning system, the vehicle may be adapted to have online abilities, for instance by supporting Wifi functionality, or by being adapted to be in radio communication with a radio communications network, such as cellular communications network, e.g. LTE, EDGE, CDMA, 4G, 3G, GPRS, or GSM, e.g. via an infotainment system of the vehicle, and/or via a mobile user device on-board the vehicle, which is in communication with the vehicle. The "digital map" may be represented fully, or at least partly, by the previously discussed "reference digital map".

Since the vehicle positioning system comprises at least a first camera adapted to be arranged on-board the vehicle, which at least first camera comprises predetermined characteristics, one or more cameras with specific characteristics are configured to, for instance, be comprised in or be mounted on the vehicle. The camera(s) may be arbitrarily arranged throughout the vehicle, for instance arranged in a protected position supporting a substantially clear view, such that a clear view of the surroundings of the vehicle may be provided. For instance, the camera(s) may be arranged behind the windscreen in the vicinity of, or embedded with, the rear view mirror. Moreover, the one or more cameras, which may refer to one or more mono cameras, may be adapted to support vision sensing. The predetermined characteristics may for instance refer to inherent and/or pre-set characteristics of the at least first camera, for instance with regards to image resolution. Moreover, the at least first camera may be represented by the reference camera, or by a camera essentially identical to, or having at least some characteristics essentially identical to, the reference camera.

Since the vehicle positioning system estimates a current position of the vehicle, for instance on a digital map, the vehicle positioning systems assumes a prevailing position of the vehicle. The estimated position of the vehicle, which for instance is expressed based on global coordinates, based on a longitudinal positioning along e.g. a road, and/or based on a relative position, may be estimated repeatedly, continuously, intermittently or on request, for instance as the vehicle travels along an arbitrary and/or selected road. The vehicle position may, at least partly, be estimated in any arbitrary manner, for instance with support from commonly known positioning techniques, such as global positioning techniques, and cost effective sensor techniques commonly provided in vehicles. Moreover, the estimated vehicle position may further be estimated based on additional input from the at least first camera. "Estimating" may, for instance, refer to "assuming", whereas the expression "current position" may refer to "prevailing position", "position at a current or prevailing point of time", and/or "position at an essentially current or essentially prevailing point of time". Moreover, "current position" may likewise include "essentially current position".

Since the vehicle positioning system furthermore captures, by means of the at least first camera, at the current position of the vehicle, a current image of a stationary physical object situated in the surroundings of the vehicle, an image of a stationary object in view of the one or more cameras is detected, while the vehicle is positioned at, or essentially at, the estimated current position. The at least first camera may capture, e.g. detect, the image of the stationary physical object in any arbitrary known manner. The "image" may for instance be 2-dimensional, and further be considered a still or static image, or an essentially still or static image. The "stationary physical object" may refer to any arbitrary stationary physical object of arbitrary shape and/or size, such as for instance at least a portion of a traffic sign, building, land mark etc. Moreover, the expression of the stationary physical object being "situated in the surroundings of the vehicle", may refer to the stationary physical object being "detectable by the at least first camera", "in view of the at least first camera" and/or "in the vicinity of the vehicle". The expression "current" image may, for instance, refer to an image captured when the vehicle was estimated to be positioned at, or essentially at, the current position.

Since the vehicle positioning system then identifies a pre-stored mapped digital object, which for instance may be pre-stored on a digital map, to correspond to the stationary physical object, a mapped digital object considered to correspond to the physical object, i.e. a mapped digital object judged to match the physical object, is identified among pre-stored mapped digital objects e.g. stored on a digital map. Identifying the mapped digital object may be accomplished at least partly with support from identifying techniques known in the art, such as by utilizing GNSS and/or GPS positioning, in combination with e.g. cost effective sensor systems commonly provided on vehicles, and comparing characteristics and/or attributes of the detected stationary physical object with mapped characteristics and/or attributes of mapped digital objects. "Identifying a mapped digital object" may refer to "identifying a matching mapped digital object", and/or "finding, determining, selecting and/or establishing a matching mapped digital object".

Since the vehicle positioning system determines a current size value of at least a portion of the stationary physical object, in the image, a size of the physical object in the image captured while the vehicle was at, or essentially at, the determined current position of the vehicle, is established. The closer the vehicle, and subsequently the at least first camera, is positioned relative the physical object, the larger is the size value of the physical object in the image. Accordingly, the size value is pertinent the position of the vehicle, i.e. the size value depends on the distance between the vehicle and the physical object. The size value, which for instance may be expressed in pixels, may refer to a measure in at least a first dimension of the physical object in the captured image. The at least first dimension may for instance refer to a 2-dimensional direction, whereby a measure of for instance a height or a width of at least a portion of the physical object in the image, may be determined. "A current size value of at least a portion of the stationary physical object in at least a first dimension of the stationary physical object" may refer to "a current size value of at least a portion of the stationary physical object in at least a first 2-dimensional direction of the stationary physical object", and/or "a current height or a current width of at least a portion of the stationary physical object". "At least a portion" of the physical object may for instance refer to the sign portion of the physical object, excluding the pole, should the physical object be represented by a traffic sign. The expression "current" size value may refer to a size value derived from the current image, which current image was captured while the vehicle was positioned at, or essentially at, the current position. "Determining" may in this context likewise refer to "measuring", "calculating" and/or "establishing".

Since the vehicle positioning system compares the current size value to a pre-stored reference size value of a reference image pre-captured by at least a first reference camera comprising the predetermined characteristics, which reference size value is associated with the current vehicle position and the mapped digital object, the current size value is compared to a value which is expected to be equal to, or essentially equal to, the current size value. That is, the reference size value refers to a reference size value of at least a portion of a stationary physical reference object, in a reference image, for instance a height and/or width thereof. Moreover, the reference image refers to a reference image pre-captured at a reference position of the reference vehicle. Furthermore, the reference size value refers to a reference size value pre-stored to be associated, e.g. linked, with the reference position, and further pre-stored to be associated, e.g. linked, with a mapped digital reference object corresponding to the stationary physical reference object. Thereby, the pre-stored reference size value is pertinent the reference position and pertinent the physical reference object, for instance the pre-stored reference size value is pertinent a relative distance between the reference position and the physical reference object. Accordingly, the pre-stored mapped digital reference object may be associated with said reference position and said reference size value relevant for that specific reference position.

Now, should the estimated current vehicle position correspond to said reference position, and furthermore the identified mapped digital object correspond to the stationary physical reference object, then the reference size value associated with the current vehicle position and the identified mapped digital object, indicates a value which the current size value is expected to be equal to, or essentially equal to. That is, the current size value is expected to correspond to, or essentially correspond to, the reference size value, since the estimated vehicle position is estimated to be at an identical, or essentially identical, relative distance from the stationary physical object as the pre-stored reference position. Thus, by deriving said pre-stored reference size value, for instance from the optional reference table, and comparing the current size value therewith, the vehicle positioning system may determine whether or not the current size value is equal to, or essentially equal to, the reference size value.

Moreover, since the at least first reference camera comprises the predetermined characteristics of the at least first camera, a more sufficient comparison of the current size value to the reference size value, is enabled. Furthermore, since the current size value may be measured in, for instance, a first dimension of the physical object in the captured image, and the pre-stored reference size value may refers to a pre-stored reference size value measurement in a corresponding first dimension of the physical reference object in the pre-captured reference image, an even more accurate comparison of the current size value to the reference size value, may be enabled.

Since the vehicle positioning system then re-evaluates the estimated current position of the vehicle based on an outcome of the comparison of the current size value to the reference size value, the vehicle positioning system re-considers the estimated current position of the vehicle while taking into account the result of the comparison. Accordingly, by comparing the current size value to the pre-stored reference size value, the vehicle positioning system may judge whether or not, or to what extent, the estimated current vehicle position may be considered a correct, or essentially correct, positioning. "Re-evaluating" may likewise refer to "re-considering" and/or "re-judging", whereas "outcome of" may refer to "result of" and/or "discrepancy resulting from". Moreover, "based on" may refer to "considering", "taking into account", and/or "taking into consideration". It should be noted that the vehicle positioning system may re-evaluate an estimated current position of the vehicle based on a plurality of comparisons of the current size values of a plurality of objects with their reference size values.

According to another embodiment, the reference size value may further be associated with a mapped position of the mapped digital object, for instance on a digital map. Thereby, a pre-stored mapped position indicating the position of the stationary physical reference object, to which the mapped digital object is identified to correspond, may be linked with the current size value and the current vehicle position. That is, a mapped reference position indicating the position of the stationary physical reference object is pre-stored to be associated with the reference size value and the reference position of the reference vehicle. That is, the reference size value is linked with the determined position of the reference vehicle at which the reference vehicle was positioned, or essentially positioned, when the reference image was captured, and furthermore linked with a mapped position of the mapped digital reference object determined to correspond to the physical reference object. Thereby, the reference size value pertinent the reference position of the reference vehicle and pertinent the physical reference object, i.e. the reference size value pertinent a relative distance between the reference position and the physical reference object, is pre-stored in association with the reference position and in association with said mapped position reflecting the position of the stationary physical reference object. Accordingly, the mapped position may be associated with the reference vehicle position and the reference size value relevant for that specific position. Thus, should the estimated position of the vehicle correspond to the reference position, and furthermore the identified mapped digital object correspond to the stationary physical reference object, then the reference size value may be associated with the mapped position of the identified mapped digital object, indicating a pre-stored mapped position of the stationary physical object. The mapped position may, for instance, be expressed based on global coordinates. Additionally or alternatively, the mapped position may be expressed based on a longitudinal positioning along e.g. a road, and/or based on a relative position.

According to another embodiment, the vehicle positioning system may further tune the estimated current position of the vehicle based on the outcome of the comparison of the current size value to the reference size value. Thereby, the vehicle positioning system may adjust the estimated position of the vehicle while taking into account the result of the comparison of the current size value to the reference size value. Accordingly, should the comparison indicate that the current size value differs from the reference size value, the vehicle positioning system may tune the estimated position in accordance therewith. For instance, should the comparison indicate that the current size value is smaller than the reference size value, which thus indicates that the current vehicle position likely is located further away from the stationary physical object than expected, i.e. than the reference position, then the estimated vehicle position may be tuned such that an updated refined vehicle position is estimated to be positioned further away from the stationary physical object by an amount corresponding to the discrepancy. Correspondingly, should the comparison indicate that the current size value is greater than the reference size value, which thus indicates that the current vehicle position likely is located closer to the stationary physical object than expected, i.e. than the reference position, then the estimated vehicle position may be tuned such that an updated refined vehicle position is estimated to be positioned closer to the stationary physical object by an amount corresponding to the discrepancy. "Tuning" may, for instance, refer to "fine-tuning", "adapting", and/or "adjusting".

Additionally or alternatively, the vehicle positioning system may further determine a confidence level value of the estimated current position of the vehicle, based on the outcome of the comparison of the current size value to the reference size value. Thereby, the vehicle positioning system may establish a reliability value of the estimated position of the vehicle, while taking into account the result of the comparison of the current size value to the reference size value. Accordingly, the vehicle positioning system may, based on the outcome of the comparison, establish whether or not the vehicle is likely to be positioned at, or essentially at, the estimated vehicle position. For instance should the comparison indicate that the current size value greatly differs from the reference size value, then the vehicle positioning system may determine that the estimated vehicle position to great extent is incorrect; a situation which thus represents a relatively low confidence level value. Correspondingly, should the comparison for instance indicate that the current size value is equal to, or essentially equal to, the reference size value, then the vehicle positioning system may determine that the estimated vehicle position is correct, or essentially correct; a situation which thus represents a relatively high confidence level value. The determined confidence level value of the estimated current vehicle position may be utilized as reliability input to an aggregated confidence level estimation, which aggregated confidence level estimation in addition to considering the determined confidence level value, may take other reliability input into account. "Confidence level value" may refer to a value of credibility, reliability, and/or trustworthiness, whereas "determining" in this context may refer to "establishing", "calculating", "deriving", and/or "estimating".

According to yet another embodiment, the vehicle positioning system may further update the reference size value. Thereby, should an alternative size value pertinent the stationary physical object and pertinent the current vehicle position, be considered more correct than the pre-stored reference size value, then the pre-stored reference size value may be updated. That is, a reference size value may be considered more correct the closer to the stationary physical reference object the reference position of the reference vehicle is located. Correspondingly, a current size value may be considered more correct the closer to the stationary physical object the current vehicle position is located. Accordingly, the alternative size value may for instance arise from the vehicle positioning system determining that a current size value is considered more correct than the pre-stored reference size value, whereby the pre-stored reference size value may be replaced. Moreover, the alternative size value may for instance arise from input from other vehicles, for instance be means of cloud functionality, having experienced the same conditions as the vehicle positioning system in question; that is, for instance having been driven along for instance the same road and learned of relevant size values, such as correct, or essentially correct, size values.

According to another embodiment, the object is achieved by a vehicle positioning system for enabling improved positioning of a vehicle, for instance on a digital map. The vehicle positioning system comprises at least a first camera adapted to be arranged on-board the vehicle, which at least first camera comprises predetermined characteristics. The vehicle positioning system further comprises a positioning unit adapted for estimating a current position of the vehicle, for instance on the digital map. The vehicle positioning system furthermore comprises, an image capturing unit adapted for capturing, by means of the at least first camera, at the current position of the vehicle, a current image of a stationary physical object situated in the surroundings of the vehicle. Moreover, the vehicle positioning system comprises a digital object identifying unit adapted for identifying a pre-stored mapped digital object, for instance pre-stored on the digital map, to correspond to the stationary physical object. The vehicle positioning system furthermore comprises a size determining unit adapted for determining a current size value of at least a portion of the stationary physical object, in the current image, for instance in at least a first dimension of the stationary physical object in the current image. Moreover, the vehicle positioning system comprises a size comparing unit adapted for comparing the current size value to a pre-stored reference size value of a reference image pre-captured by at least a first reference camera comprising the predetermined characteristics, which reference size value, which for instance is stored in association with the digital map data, is associated with the current vehicle position and the mapped digital object. The vehicle positioning unit further comprises a re-evaluating unit adapted for re-evaluating the estimated current position of the vehicle, for instance on the digital map, based on an outcome of the comparison of the current size value to the reference size value. It should be noted that a plurality of cameras may be used to determine a current size value of at least one portion of a stationary object, or to determine current size values of at least one portion of a plurality of stationary objects.

According to another embodiment, the reference size value may further be associated with a mapped position of the mapped digital object, for instance on the digital map. According to another embodiment, the vehicle positioning system may further comprise a positioning tuning unit adapted for tuning the estimated current position of the vehicle based on the outcome of the comparison of the current size value to the pre-stored reference size value. Additionally or alternatively, the vehicle positioning system may further comprise a confidence level determining unit adapted for determining a confidence level value of the estimated current position of the vehicle, based on the outcome of the comparison of the current size value to the pre-stored reference size value. According to yet another embodiment, the vehicle positioning system may further comprise a reference size updating unit adapted for updating the reference size value.

Once more, similar advantages as those mentioned in the foregoing in relation to the third embodiment correspondingly apply to the fourth, so these advantages are not further discussed.

According to another embodiment, the object is achieved by a vehicle comprising at least a portion of the object size mapping system discussed above. Additionally or alternatively, the object is achieved by a vehicle comprising at least a portion of the vehicle positioning system discussed above. Yet again, similar advantages as those mentioned in the foregoing in relation to the first and/or third embodiments correspondingly apply to the fifth, so these advantages are not further discussed.

According to another embodiment, the object is achieved by a computer program product comprising a computer program containing computer program code or instructions arranged to cause a computer or a processor to execute the steps of the object size mapping system discussed in the foregoing, and/or the steps of the vehicle positioning system discussed in the foregoing, stored on a computer-readable medium or a carrier wave. Once again, similar advantages as those mentioned in the foregoing in relation to the first and/or third embodiments correspondingly apply to the sixth, so these advantages are not further discussed.

BRIEF DESCRIPTION OF THE DRAWINGS

The non-limiting embodiments of the disclosure, including particular features and advantages, will be readily understood from the following detailed description and the accompanying drawings, in which:

FIG. 3 illustrates an exemplifying reference table according to embodiments of the disclosure;

DETAILED DESCRIPTION

Figure 1:
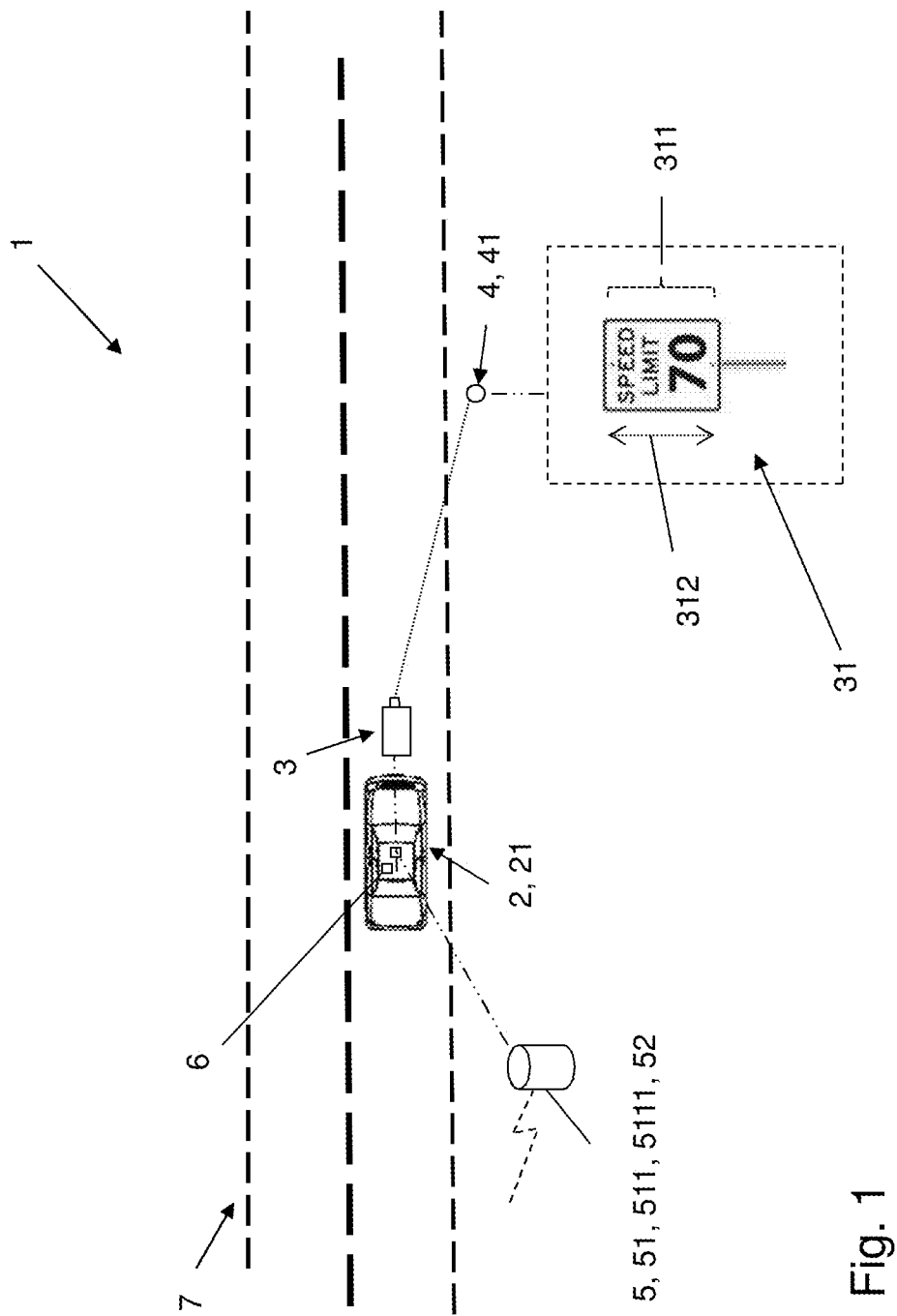
FIG. 1 illustrates a schematic overview of an exemplifying object size mapping system according to embodiments of the disclosure.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The non-limiting embodiments of the present disclosure will now be described more fully hereinafter with reference to the accompanying drawings, in which embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to enabling improved positioning of a vehicle, there will be disclosed that longitudinal and/or lane vehicle positioning may be improved for a vehicle.

Referring now to the figures and FIG. 1 in particular, there is depicted a schematic overview of an exemplifying object size mapping system 1 according to embodiments of the disclosure. The object size mapping system 1, which will be described in further detail later on in this description, comprises at least a first reference camera 3 adapted to be arranged on-board a reference vehicle 2. The at least first reference camera 3 may comprise predetermined characteristics. Moreover, the at least one reference camera 3 is here a mono camera comprised in the rearview mirror of the vehicle 2, whereas the reference vehicle 2 is represented by a cartography vehicle, for instance a cartography car. The reference vehicle 2 here comprises at least a portion of the object size mapping system 1. Moreover, the reference vehicle 2 is in the shown embodiment provided with one or more high-resolution positioning devices 6, for instance a laser scanning system for 3-dimensional data acquisition, in combination with a global positioning system. The reference vehicle 2 is here situated at a determined current reference position 21, on an exemplifying road 7. The exemplifying road 7 may be represented by any suitable surface intended for vehicle driving, for instance autonomous driving, and the road 7 may be of any shape, width and length, and comprise any arbitrary number of lanes, intersections, cross sections etc. Situated in the surroundings of the reference vehicle 2 is an exemplifying stationary physical reference object 4, which here is represented by a speed limit sign. The stationary physical reference object 4 is here situated along the exemplifying road 7.

Also depicted in exemplifying FIG. 1, is a current reference image 31 of the stationary physical reference object 4, captured by means of the at least first reference camera 3, at the current reference position 21 of the reference vehicle 2. At least a portion of the stationary physical reference object 4, in the current reference image 31, has a determined current reference size value 311. The current reference size value 311 is here measured in at least a first dimension 312 of the stationary physical reference object 4 in the current reference image 31.

Furthermore depicted in the shown embodiment is a reference digital map 5, for instance at least partly comprised in a reference map data database, which may comprise reference map data 51. A mapped digital reference object 511 corresponding to the stationary physical reference object 4, and an optional mapped position 5111 of the mapped digital reference object 511 which indicates a physical position 41 of the stationary physical reference object 4, may be stored on, and/or comprised in, the reference digital map 5, the reference map data database and/or the reference map data 51. Associated with the reference digital map 5 is also an exemplifying reference table 52, which will be further described in conjunction with FIG. 3.

Figure 2:
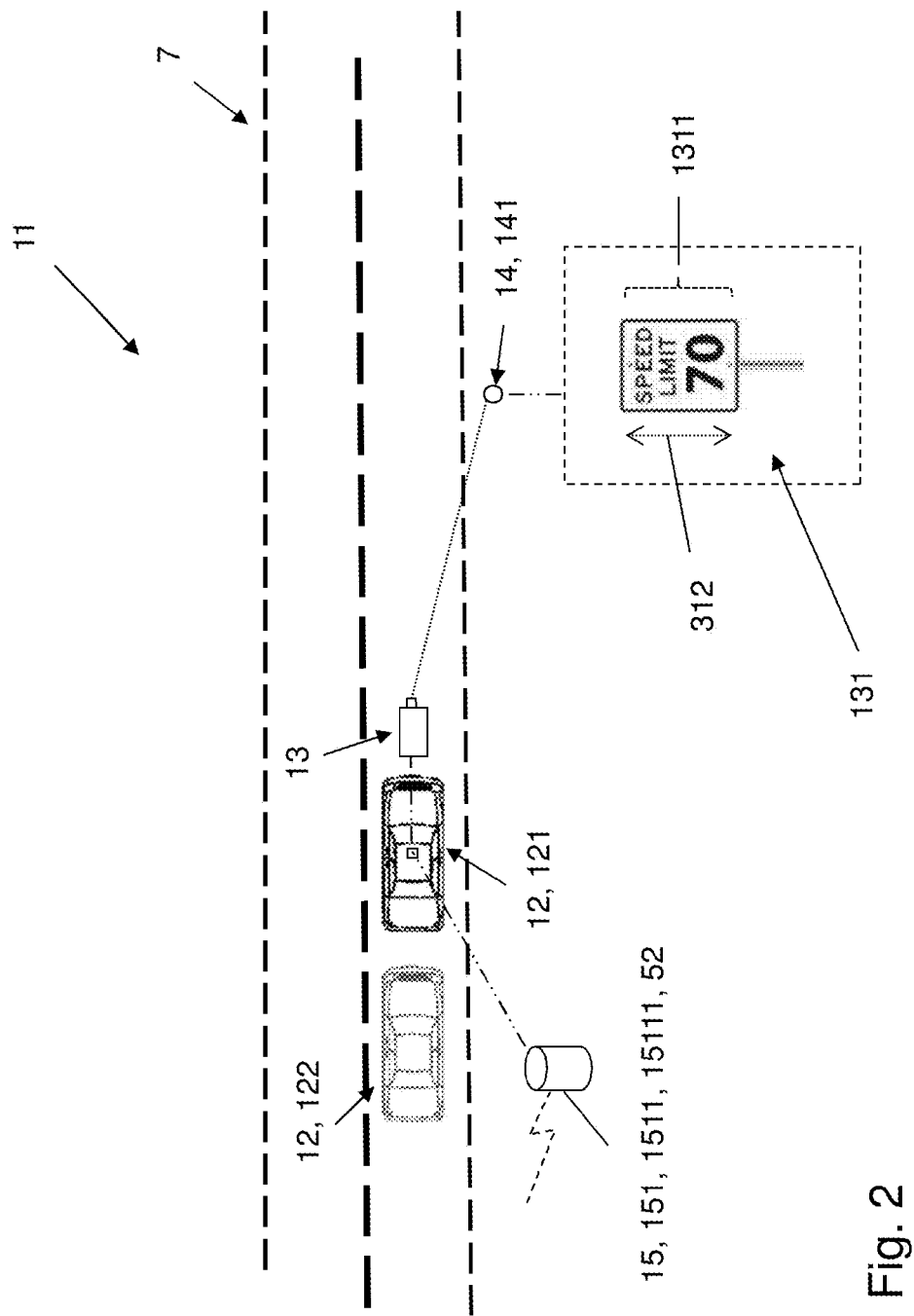
FIG. 2 illustrates a schematic overview of an exemplifying vehicle positioning system according to embodiments of the disclosure.

FIG. 2 illustrates a schematic overview of an exemplifying vehicle positioning system 11 according to embodiments of the disclosure. The vehicle positioning system 11, which will be described in further detail later on in this description, comprises at least a first camera 13 adapted to be arranged on-board a vehicle 12. The at least first camera 13 comprises the predetermined characteristics of the at least first reference camera 3 of FIG. 1. The at least one camera 13 is here a mono camera comprised in the rearview mirror of the vehicle 12, whereas the vehicle 12 is represented by an autonomous car. The vehicle 12 here comprises at least a portion of the vehicle determining system 11. Moreover, the vehicle 12 is here situated at an estimated current position 121, on the previously discussed exemplifying road 7 introduced in the exemplifying embodiment of FIG. 1. Here, the estimated current vehicle position 121 is estimated to be a position coinciding with the reference position 21 of the reference vehicle 2 in the embodiment of FIG. 1. A refined position 122 of the vehicle 12 slightly differs from the estimated vehicle position 121, and subsequently from the reference position 21 of the reference vehicle 2. Situated in the surroundings of the vehicle 12 is an exemplifying stationary physical object 14, which here is represented by the previously discussed stationary physical reference object 4 introduced in FIG. 1.

Also depicted in exemplifying FIG. 2, is a current image 131 of the stationary physical object 14, captured by means of the at least first camera 3, at the estimated current position 21 of the vehicle 12. At least a portion of the stationary physical object 14, in the current image 131, has a determined current size value 1311. The current size value 1311 is here measured in the previously discussed at least first dimension 312 introduced in FIG. 1.

Furthermore depicted in the shown embodiment of FIG. 2 is a digital map 15, for instance at least partly comprised in a map data database, which may comprise digital pre-stored map data 151. A mapped digital object 1511 identified to correspond to the stationary physical object 14, and an optional mapped position 15111 of the mapped digital reference object 1511 which indicates an assumed physical position 141 of the stationary physical object 14, may be stored on, and/or comprised in, the digital map 15, the map data database and/or the map data 151. The digital map 15 may fully, or at least to some extent, be represented by the previously discussed reference digital map 5, and/or the map data 151 may fully, or at least to some extent, be represented by the previously discussed reference map data 51. Associated with the digital map 5 is also the exemplifying reference table 52 introduced in FIG. 1, which will be further described herein below.

FIG. 3 illustrates a schematic overview of the exemplifying reference table 52 according to embodiments of the disclosure. The reference table 52 may, for instance, be comprised in the reference digital map 5 and/or comprised in the reference map data 51 of FIG. 1. Subsequently the reference table 52 may be comprised in the digital map 15 and/or comprised in the pre-stored map data 151 of FIG. 2.

The reference table 52 may hold information on the mapped digital reference object 151 of FIG. 1, which corresponds to the stationary physical reference object 4. Here, the identified mapped digital object 1511 of FIG. 2 coincides with the mapped digital reference object 151. The reference table 52 furthermore holds information on reference positions of the reference vehicle 2 and corresponding reference size values pertinent respective reference positions, which reference positions and corresponding reference size values are associated with the digital reference object 151. Comprised among the entries of the reference table 52, may the reference position 21 of the reference vehicle 2 be found, along with the associated reference size value 311. Here, as previously discussed, the estimated vehicle position 121 of the vehicle 12 of FIG. 2 is estimated to be a position which coincides with the reference position 21 of the reference vehicle 2 of FIG. 1.

The reference table 52 may hold information on characteristics and/or attributes of the mapped digital reference object 151. According to one embodiment, the reference table 52 may comprise the mapped position 5111 of the mapped digital reference object 511 which indicates the physical position 41 of the stationary physical reference object 4. Thereby, the reference size value 311 may be associated with said mapped position 5111 indicating the physical position 41 of the stationary physical reference object 4, and furthermore associated with the reference position 21 of the reference vehicle 2. Since the identified mapped digital object 1511 of FIG. 2 coincides with the mapped digital reference object 151, and since the estimated vehicle position 121 of the vehicle 12 of FIG. 2 is estimated to be a position which coincides with the reference position 21 of the reference vehicle 2, the reference size value 311 may be associated with the mapped position 15111 of the identified mapped digital object 1511, which indicates the assumed physical position 141 of the stationary physical object 14 of FIG. 2.

Figure 4:
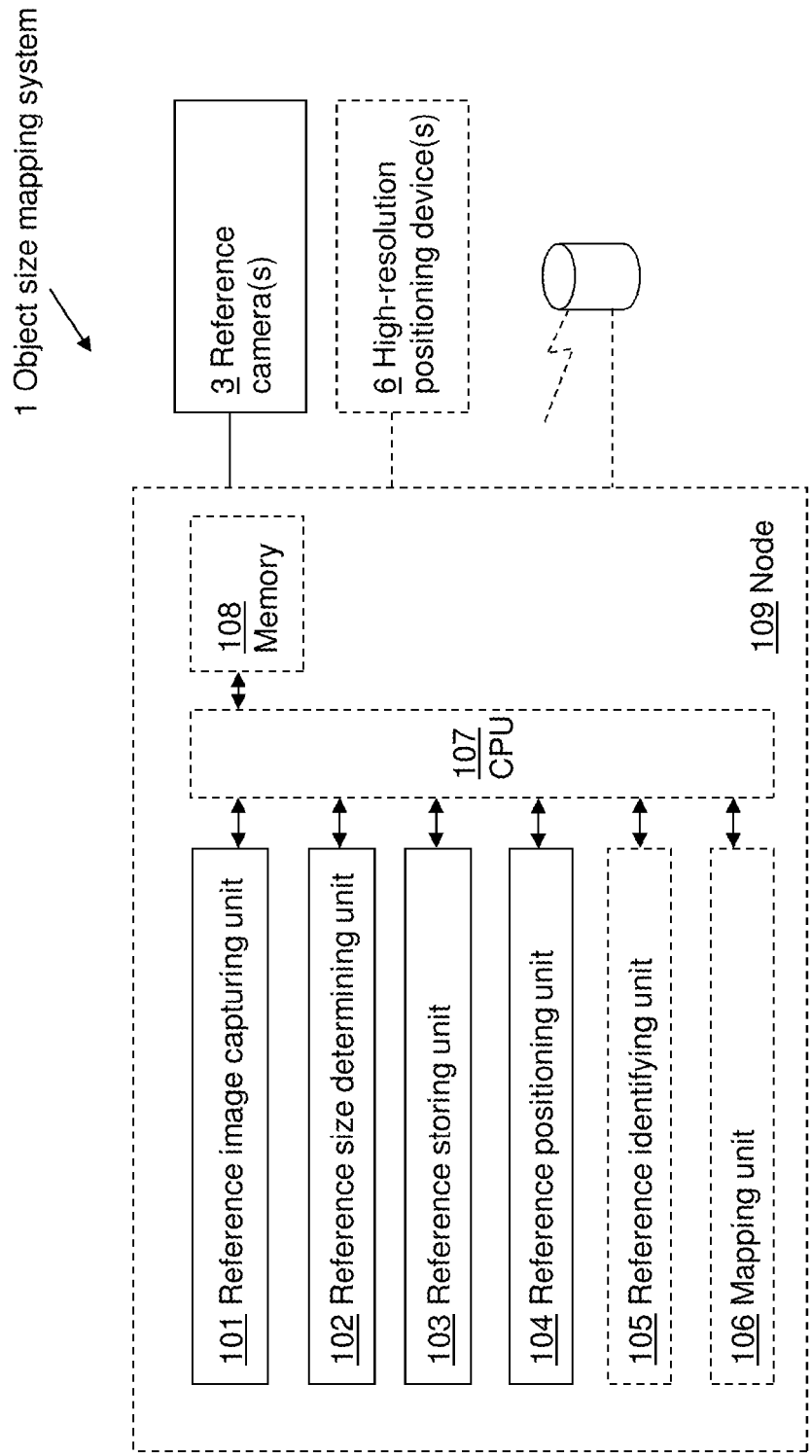
FIG. 4 illustrates a schematic block diagram illustrating an exemplifying object size mapping system according to embodiments of the disclosure.

As further shown in FIG. 4, which depicts a schematic block diagram illustrating an exemplifying object size mapping system 1 according to embodiments of the disclosure, the object size mapping system 1 is, as previously mentioned in conjunction with FIG. 1, adapted for enabling improved positioning of a vehicle 12. Moreover, as discussed above, the object size mapping system 1 comprises at least a first reference camera 3.

The object size mapping system 1 further comprises a reference positioning unit 104, a reference image capturing unit 101, a reference size determining unit 102, and a reference storing unit 103, all of which will be described in further detail below. Moreover, the object size mapping system 1 may comprise an optional reference identifying unit 105 and/or an optional mapping unit 106, which in a similar manner will be described in further detail later on in this description. Furthermore, the embodiments herein for enabling improved positioning of a vehicle 12, may be implemented through one or more processors, such as a processor 107, here denoted CPU, together with computer program code for performing the functions and actions of the embodiments herein. Said program code may also be provided as a computer program product, for instance in the form of a data carrier carrying computer program code for performing the embodiments herein when being loaded into the object size mapping system 1. One such carrier may be in the form of a CD ROM disc. It is however feasible with other data carriers such as a memory stick. The computer program code may furthermore be provided as pure program code on a server and downloaded to the object size mapping system 1.

The object size mapping system 1 may further comprise a memory 108 comprising one or more memory units. The memory 108 may be arranged to be used to store e.g. information, and further to store data, configurations, schedulings, and applications, and for instance digital maps 5, map data 51, mapped digital objects 511, positions of mapped digital objects 5111, reference tables 52, reference positions 21 of the reference vehicle 2, positions 41 of stationary physical reference objects 4, images 31, reference size values 311 etc., to perform the methods herein when being executed in the object size mapping system 1. Furthermore, the reference positioning unit 104, the reference image capturing unit 101, the reference size determining unit 102, the reference storing unit 103, the optional reference identifying unit 105, the optional mapping unit 106, the optional processor 107, and the optional memory 108, may for instance be implemented in one or several arbitrary nodes 109, arranged locally on-board the reference vehicle 2 and/or implemented remotely therefrom such as in one or more databases and/or servers, which may support e.g. cloud functionality. The node 109 may be an electronic control unit (ECU) or any suitable generic electronic device, and may involve, for instance, a cartography node or a main central node. The disposition of the functionality between e.g. the node(s) 109 and e.g. remotely arranged databases and/or servers may be arbitrary selected as considered suitable. According to an alternative example, the nodes 109 may, rather than being represented by e.g. one or several integrated ECUs, be represented by a plug-in solution, for instance a dongle. In that manner, an aftermarket solution may be provided to any arbitrary vehicle suitable.

Those skilled in the art will also appreciate that the reference positioning unit 104, the reference image capturing unit 101, the reference size determining unit 102, the reference storing unit 103, the optional reference identifying unit 105, and/or the optional mapping unit 106, and/or any of the units described herein, may refer to a combination of analog and digital circuits, and/or one or more processors configured with software and/or firmware, e.g. stored in a memory such as the memory 108, that when executed by the one or more processors such as the processor 107 perform as will be described in more detail below. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 5:
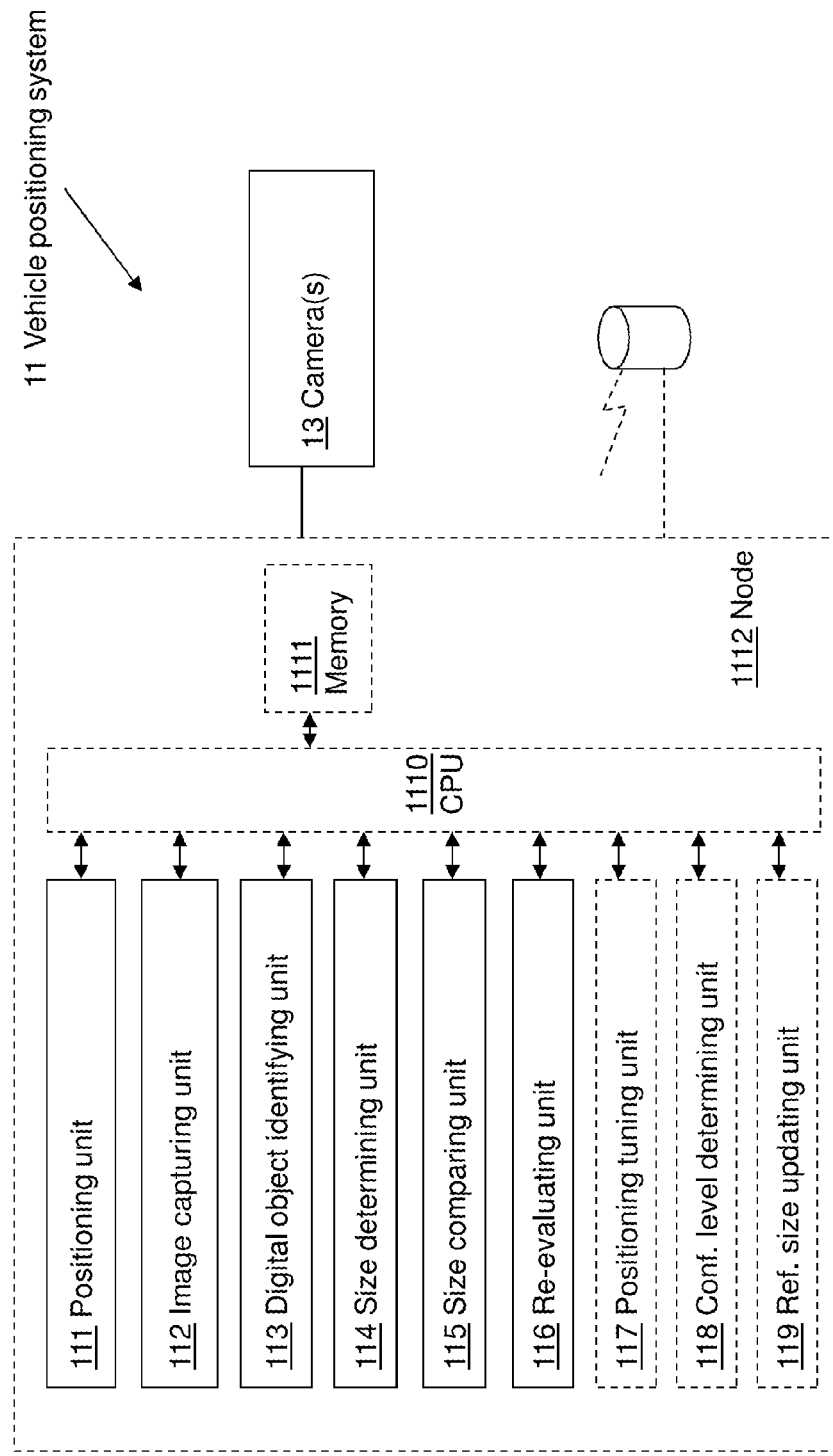
FIG. 5 illustrates a schematic block diagram illustrating an exemplifying vehicle positioning system according to embodiments of the disclosure.

As further shown in FIG. 5, which depicts a schematic block diagram illustrating an exemplifying vehicle positioning system 11 according to embodiments of the disclosure, the vehicle positioning system 11 is, as previously mentioned in conjunction with FIG. 2, adapted for enabling improved positioning of a vehicle 12. Moreover, as discussed above, the vehicle positioning system 11 comprises at least a first camera 13 adapted to be arranged on-board the vehicle 12, which at least first camera 13 comprises predetermined characteristics.

The vehicle positioning system 11 further comprises a positioning unit 111, an image capturing unit 112, a digital object identifying unit 113, a size determining unit 114, a size comparing unit 115, and a re-evaluating unit 116, all of which will be described in further detail below. Moreover, the vehicle positioning system 11 may comprise an optional positioning tuning unit 117, an optional confidence level determining unit 118, and/or an optional reference size updating unit 119, which in a similar manner will be described in further detail later on in this description. Furthermore, the embodiments herein for enabling improved positioning of a vehicle 12, may be implemented through one or more processors, such as a processor 1110, here denoted CPU, together with computer program code for performing the functions and actions of the embodiments herein. Said program code may also be provided as a computer program product, for instance in the form of a data carrier carrying computer program code for performing the embodiments herein when being loaded into the vehicle positioning system 11. One such carrier may be in the form of a CD ROM disc. It is however feasible with other data carriers such as a memory stick. The computer program code may furthermore be provided as pure program code on a server and downloaded to the vehicle positioning system 1.

The vehicle positioning system 11 may further comprise a memory 1111 comprising one or more memory units. The memory 1111 may be arranged to be used to store e.g. information, and further to store data, configurations, schedulings, and applications, and for instance digital maps 15, map data 151, mapped digital objects 511, 1511, positions of mapped digital objects 5111, 15111, reference tables 52, reference positions 21 of the reference vehicle 2, vehicle positions 121, physical positions 41, 141 of stationary physical objects 4, 14, images 31, 131, size values 311, 1311 etc., to perform the methods herein when being executed in the vehicle positioning system 11. Furthermore, the positioning unit 111, the image capturing unit 112, the digital object identifying unit 113, the size determining unit 114, the size comparing unit 115, the re-evaluating unit 116, the optional positioning tuning unit 117, the optional confidence level determining unit 118, the optional reference size updating unit 119, the optional processor 1110, and the optional memory 1111, may for instance be implemented in one or several arbitrary nodes 1112, arranged locally on-board the vehicle 12 and/or implemented remotely therefrom such as in one or more databases and/or servers, which may support e.g. cloud functionality. The node 1112 may be an electronic control unit (ECU) or any suitable generic electronic device, and may involve, for instance, a positioning node or a main central node. The disposition of the functionality between e.g. the node(s) 1112 and e.g. remotely arranged databases and/or servers may be arbitrary selected as considered suitable. According to an alternative example, the nodes 1112 may, rather than being represented by e.g. one or several integrated ECUs, be represented by a plug-in solution, for instance a dongle. In that manner, an aftermarket solution may be provided to any arbitrary vehicle suitable.

Those skilled in the art will also appreciate that the positioning unit 111, the image capturing unit 112, the digital object identifying unit 113, the size determining unit 114, the size comparing unit 115, the re-evaluating unit 116, the optional positioning tuning unit 117, the optional confidence level determining unit 118, and/or the optional reference size updating unit 119, and/or any of the units described herein, may refer to a combination of analog and digital circuits, and/or one or more processors configured with software and/or firmware, e.g. stored in a memory such as the memory 1111, that when executed by the one or more processors such as the processor 1110 perform as will be described in more detail below. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 6:
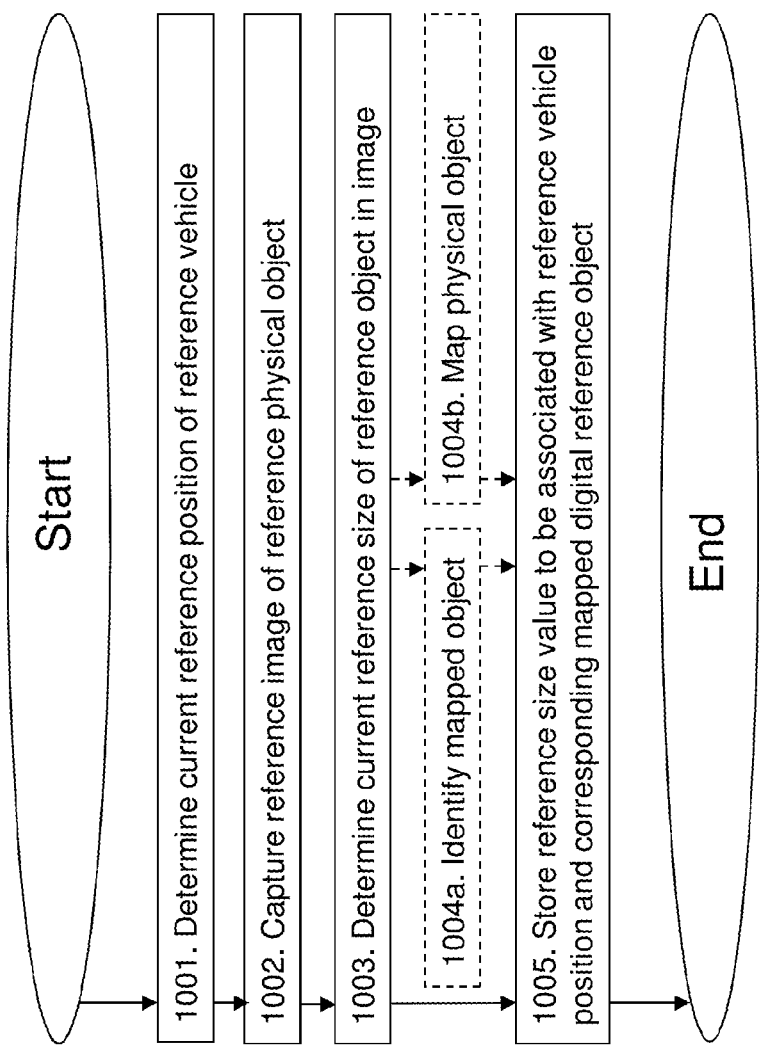
FIG. 6 is a flowchart depicting an exemplifying method performed by an object size mapping system according to embodiments of the disclosure.

FIG. 6 is a flowchart depicting an exemplifying method performed by an object size mapping system 1 according to embodiments of the disclosure. The method in the object size mapping system 1 is for enabling improved positioning of a vehicle 12. As previously discussed in conjunction with FIG. 1, the object size mapping system 1 comprises at least the first reference camera 3 adapted to be arranged on-board the reference vehicle 2. The exemplifying method, which may be continuously repeated, comprises the following actions discussed with support from essentially FIGS. 1, 3 and 4. The actions may be taken in any suitable order, and/or one or more actions may even be performed simultaneously where applicable. For instance, Action 1002 and/or Action 1003 may be performed prior to, or simultaneously with, Action 1001.

Action 1001

In Action 1001, the object size mapping system 1 determines, e.g. by means of the reference positioning unit 104, the current reference position 21 of the reference vehicle 2. Correspondingly, the reference positioning unit 104 is adapted for determining the current reference position 21 of the reference vehicle 2. The current reference position 21 may for instance be determined with support from the one or more high-resolution positioning devices 6.

Action 1002

In Action 1002, the object size mapping system 1 captures, e.g. by means of the reference image capturing unit 101, and by means of the at least first reference camera 3, at the current reference position 21 of the reference vehicle 2, the current reference image 31 of the stationary physical reference object 4 situated in the surroundings of the reference vehicle 2. Correspondingly, the reference image capturing unit 101 is adapted for capturing, by means of the at least first reference camera 3, at the current reference position 21 of the reference vehicle 2, the current reference image 31 of the stationary physical reference object 4 situated in the surroundings of the reference vehicle 2.

Action 1003

In Action 1003, the object size mapping system 1 determines, e.g. by means of the reference size determining unit 102, the current reference size value 311 of at least a portion of the stationary physical reference object 4, in the current reference image 31. Correspondingly, the reference size determining unit 102 is adapted for determining the current reference size value 311 of at least a portion of the stationary physical reference object 4, in the current reference image 31.

Action 1004

In optional Action 1004a, the object size mapping system 1 may, e.g. by means of the reference identifying unit 105, identify the mapped digital reference object 511 on the reference digital map 5. Correspondingly, the reference identifying unit 105 may be adapted for identifying the mapped digital reference object 511 on the reference digital map 5.

Alternatively, in optional Action 1004b, the object size mapping system 1 may, e.g. by means of the mapping unit 106, map the stationary physical reference object 4 to the reference digital map 5. Correspondingly, the mapping unit 106 may be adapted for mapping the stationary physical reference object 4 to the reference digital map 5.

Action 1005

In Action 1005, the object size mapping system 1 stores, e.g. by means of the reference storing unit 103, the current reference size value 311 to be associated with the current reference position 21 of the reference vehicle 2 and associated with the mapped digital reference object 511 corresponding to the stationary physical reference object 4. Correspondingly, the reference storing unit 103 is adapted for storing the current reference size value 311 to be associated with the current reference position 21 of the reference vehicle 2 and associated with the mapped digital reference object 511 corresponding to the stationary physical reference object 4. The current reference size value 311, the current reference position 21 and the mapped digital reference object 511 may for instance be associated with one another via the reference table 52.

Optionally, the current reference size value 311 may be stored to further be associated with the mapped position 41 of the mapped digital reference object 511, which mapped position 41 indicates a position 41 of the stationary physical reference object 4. Correspondingly, the reference storing unit 103 may further be adapted for storing the current reference size value 311 to be associated with the mapped position 41 of the mapped digital reference object t511, which mapped position 41 indicates a position of the stationary physical reference object 4.

Thereby, the current reference size value 311 may be linked with the determined reference position 21 at which the reference vehicle 2 was determined to be positioned, or essentially positioned, when the reference image 31 was captured, and furthermore linked with a mapped digital object 511 considered to correspond to the physical reference object 4. Thereby, a specific reference size value 311 pertinent the current reference position 21 and pertinent the physical reference object 4, may be stored in association with said current reference position 21 and in association with said mapped digital reference object 511. Subsequently, should the actions described in the foregoing be repeated continuously or intermittently as the reference vehicle 2 for instance travels along the exemplifying road 7, that is, should a plurality of reference positions of the reference vehicle 2 be determined, a plurality of reference images of the stationary physical reference object 4 be captured, and a plurality of reference size values be determined, then a specific mapped digital reference object may, for different reference positions of the reference vehicle 2, be stored, for instance in the reference table 52, to be associated with different reference size values which respectively are pertinent the respective reference positions.

Figure 7:
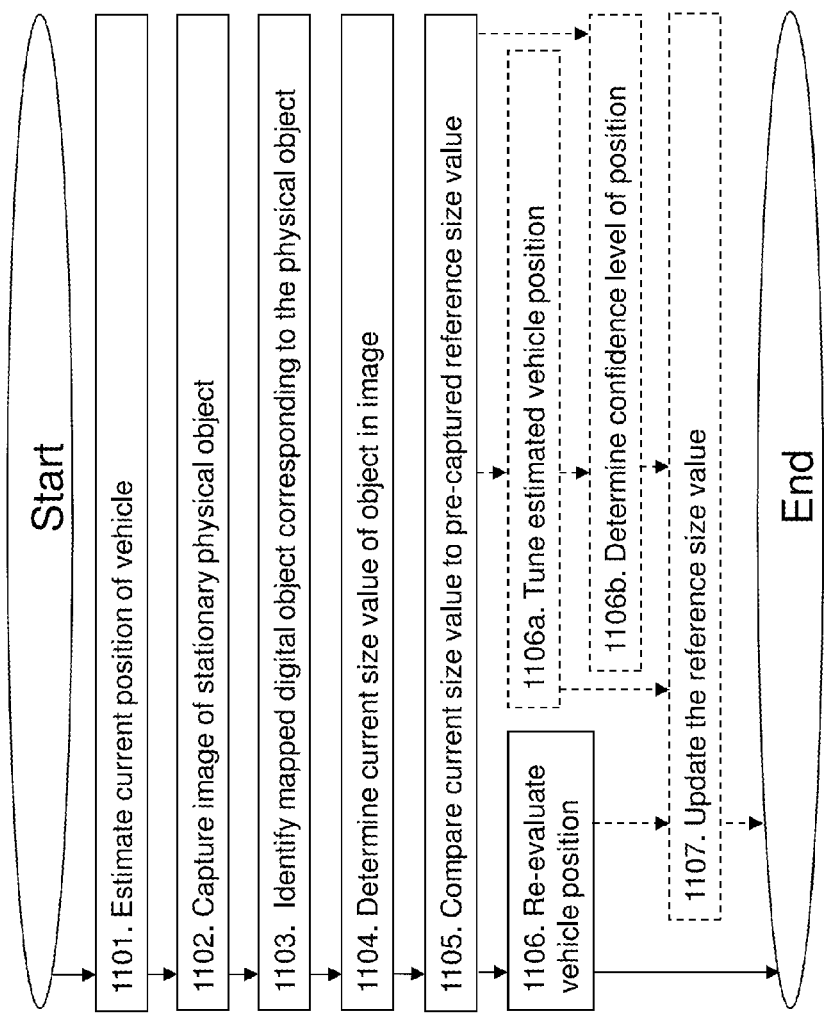
FIG. 7 is a flowchart depicting an exemplifying method performed by a vehicle positioning system according to embodiments of the disclosure.

FIG. 7 is a flowchart depicting an exemplifying method performed by a vehicle positioning system 11 according to embodiments of the disclosure. The method in the vehicle positioning system 11 is for enabling improved positioning of a vehicle 12. As previously discussed in conjunction with FIG. 2, the vehicle positioning system 11 comprises at least the first camera 23 adapted to be arranged on-board the vehicle 12, which at least first camera 13 comprises predetermined characteristics. The exemplifying method, which may be continuously repeated, comprises the following actions discussed with support from essentially FIGS. 1, 2, 3 and 5. The actions may be taken in any suitable order, and/or one or more actions may even be performed simultaneously where applicable. For instance, one or more of Actions 1102-1105 may be performed prior to, or simultaneously with, Action 1101.

Action 1101

In Action 1101, the vehicle positioning system 11 estimates, e.g. by means of the positioning unit 111, the current position 121 of the vehicle 12, as shown in FIG. 2. Correspondingly, the positioning unit 111 is adapted for estimating the current position 121 of the vehicle 12.

Action 1102

In Action 1102, the vehicle positioning system 11 captures, e.g. by means of the image capturing unit 112, and by means of the at least first camera 13, at the current position 121 of the vehicle 12, the current image 131 of the stationary physical object 14 situated in the surroundings of the vehicle 12. Correspondingly, the image capturing unit 112 is adapted for capturing, by means of the at least first camera 13, at the current position 121 of the vehicle 12, the current image 131 of the stationary physical object 14 situated in the surroundings of the vehicle 12.

Action 1103

In Action 1103, the vehicle positioning system 11 identifies, e.g. by means of the digital object identifying unit 113, the pre-stored mapped digital object 1511 to correspond to the stationary physical object 14. Correspondingly, the digital object identifying unit 113 is adapted for identifying the pre-stored mapped digital object 1511 to correspond to the stationary physical object 14.

Action 1104

In Action 1104, the vehicle positioning system 11 determines, e.g. by means of the size determining unit 114, the current size value 1311 of at least a portion of the stationary physical object 14, in the image 131. Correspondingly, the size determining unit 114 is adapted for determining the current size value 1311 of at least a portion of the stationary physical object 14, in the image 131.

Action 1105

In Action 1105, the vehicle positioning system 11 compares, e.g. by means of the size comparing unit 115, the current size value 1311 to the pre-stored reference size value 311 of the reference image 31 pre-captured by at least the first reference camera 3 comprising the predetermined characteristics, which reference size value 311 is associated with the current vehicle position 121 and the mapped digital object 1511. Correspondingly, the size comparing unit 115 is adapted for comparing the current size value 1311 to the pre-stored reference size value 311 of the reference image 31 pre-captured by at least the first reference camera 3 comprising the predetermined characteristics, which reference size value 311 is associated with the current vehicle position 121 and the mapped digital object 1511.

Thereby, the current size value 1311 is compared to a value 311 which it is expected to be equal to, or essentially equal to. That is, the current size value 1311 is expected to correspond to, or essentially correspond to, the reference size value 311, since the vehicle 12 is estimated to be at an identical, or essentially identical, relative distance from the stationary physical object 14 as the pre-stored reference position 21. Thus, by deriving the pre-stored reference size value 311, for instance from the optional reference table 52, and comparing the current size value 1311 therewith, the vehicle positioning system 11 may determine whether or not the current size value 1311 is equal to, or essentially equal to, the reference size value 311.

Optionally, the reference size value 311 may further be associated with the mapped position 15111 of the mapped digital object 1511, which mapped position 15111 indicates an assumed position 141 of the stationary physical object 14.

Action 1106

In Action 1106, the vehicle positioning system 11 re-evaluates, e.g. by means of the re-evaluating unit 116, the estimated current position 121 of the vehicle 12 based on an outcome of the comparing of Action 1105 of the current size value 1311 to the reference size value 311. Correspondingly, the re-evaluating unit 116 is adapted for re-evaluating the estimated current position 121 of the vehicle 12 based on an outcome of the comparing of Action 1105 of the current size value 1311 to the reference size value 311.

Thereby, the vehicle positioning system 11 re-considers the estimated current position 121 of the vehicle 12 while taking into account the result of the comparing of the current size value 1311 to the reference size value 311 of Action 1105. Accordingly, by comparing the current size value 1311 to the pre-stored reference size value 311, the vehicle positioning system 11 may judge whether or not, or to what extent, the estimated current vehicle position 121 may be considered a correct, or essentially correct, positioning Optionally, the vehicle positioning system 11 may, in Action 1106a, for instance by means of the positioning tuning unit 117, tune the estimated current position 121 of the vehicle 12 based on the outcome of the comparing of Action 1105 of the current size value 1311 to the reference size value 311. Correspondingly, the positioning tuning unit 117 may be adapted for tuning the estimated current position 121 of the vehicle 12 based on the outcome of the comparing of Action 1105 of the current size value 1311 to the reference size value 311. Thereby, the vehicle positioning system 11 may refine the estimated position 121 of the vehicle 12 while taking into account the result of the comparison of Action 1105 of the current size value 1311 to the reference size value 311. Here, the comparison indicates that the current size value 1311 differs from the reference size value 311, whereby the vehicle positioning system 11 may tune the estimated position 121 in accordance therewith. According to the shown embodiment, the comparison indicates that the current size value 1311 is smaller than the reference size value 311, which thus indicates that the current vehicle position 121 likely is located further away from the stationary physical object 14 than expected, i.e. than the reference position 21. The estimated vehicle position 121 may then be tuned such that an updated vehicle position, here the refined position 122 as shown in FIG. 2, is estimated to be positioned further away from the stationary physical object 14 by an amount corresponding to the discrepancy.

Additionally or alternatively, the vehicle positioning system 11 may, in Action 1106b, for instance by means of the confidence level determining unit 118, determine a confidence level value of the estimated current position 121 of the vehicle 12, based on the outcome of the comparing of Action 1105 of the current size value 1311 to the reference size value 311. Correspondingly, the confidence level determining unit 118 may be adapted for determining a confidence level value of the estimated current position 121 of the vehicle 12, based on the outcome of the comparing of Action 1105 of the current size value 1311 to the reference size value 311. Thereby, the vehicle positioning system 11 may establish a reliability value of the estimated position 121 of the vehicle 2, while taking into account the result of the comparison of the current size value 1311 to the reference size value 311 of Action 1105. Accordingly, the vehicle positioning system 11 may, based on the outcome of the comparison, establish whether or not the vehicle 2 is likely to be positioned at, or essentially at, the estimated vehicle position 121.

Action 1104

In optional Action 1107, the vehicle positioning system 11 may update, e.g. by means of the reference size updating unit 119, the reference size value 311. Correspondingly, the reference size updating unit 119 may be adapted for updating the reference size value 311. Thereby, should an alternative size value pertinent the stationary physical object 13 and pertinent the current vehicle position 121, be considered more correct than the pre-stored reference size value 311, then the pre-stored reference size 311 value may be updated.

The person skilled in the art realizes that the present disclosure by no means is limited to the embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method performed by an object size mapping system for enabling improved object mapping to support improved positioning of a vehicle, the object size mapping system comprising a first reference camera adapted to be arranged on-board a reference vehicle, the method comprising:
   determining a current reference position of the reference vehicle;
   capturing by the first reference camera, at the current reference position of the reference vehicle, a current reference image of a stationary physical reference object situated in the surroundings of the reference vehicle;
   determining a current reference size value of at least a portion of the stationary physical reference object in the current reference image; and
   storing the current reference size value to be associated with the current reference position of the reference vehicle, and with a mapped digital reference object corresponding to the stationary physical reference object.

2. The method according to claim 1 wherein storing further comprises storing the current reference size value to be associated with a mapped position of the mapped digital reference object.

3. The method according to claim 1 further comprising:
   identifying the mapped digital reference object on a reference digital map; and/or
   mapping the stationary physical reference object to the reference digital map.

4. A method performed by a vehicle positioning system for enabling improved object mapping to support improved positioning of a vehicle, the vehicle positioning system comprising a first camera adapted to be arranged on-board the vehicle, the first camera comprising predetermined characteristics, the method comprising:
   estimating a current position of the vehicle;
   capturing, by the first camera at the current position of the vehicle, a current image of a stationary physical object situated in surroundings of the vehicle;
   identifying a pre-stored mapped digital object to correspond to the stationary physical object;

determining a current size value of at least a portion of the stationary physical object in the image;

comparing the current size value to a pre-stored reference size value of a reference image pre-captured by the first camera comprising the predetermined characteristics, which reference size value is associated with the current vehicle position and the mapped digital object; and re-evaluating the estimated current position of the vehicle based on an outcome of the comparing the current size value to the reference size value.

5. The method according to claim 4 wherein the reference size value is further associated with a mapped position of the mapped digital object.

6. The method according to claim 4 wherein re-evaluating further comprises:

tuning the estimated current position of the vehicle based on the outcome of comparing; and/or determining a confidence level value of the estimated current position of the vehicle, based on the outcome of comparing.

7. The method according to claim 4 further comprising updating the reference size value.

8. An object size mapping system for enabling improved object mapping to support improved positioning of a vehicle, the object size mapping system comprising:

a first reference camera adapted to be arranged on-board a reference vehicle;

a reference positioning unit adapted for determining a current reference position of the reference vehicle;

a reference image capturing unit adapted for capturing, using the first reference camera, at the current reference position of the reference vehicle, a current reference image of a stationary physical reference object situated in surroundings of the reference vehicle;

a reference size determining unit adapted for determining a current reference size value of at least a portion of the stationary physical reference object in the current reference image; and a reference storing unit adapted for storing the current reference size value to be associated with the current reference position of the reference vehicle, and with a mapped digital reference object corresponding to the stationary physical reference object.

9. The object size mapping system according to claim 8 wherein the reference storing unit is further adapted for storing the current reference size value to be associated with a mapped position of the mapped digital reference object.

10. The object size mapping system according to claim 8 further comprising:

a reference identifying unit adapted for identifying the mapped digital reference object on a reference digital map; and/or a mapping unit adapted for mapping the stationary physical reference object to the reference digital map.

11. A vehicle positioning system for enabling improved object mapping to support improved positioning of a vehicle, the vehicle positioning system comprising:

a first camera adapted to be arranged on-board the vehicle, the first camera comprising predetermined characteristics;

a positioning unit adapted for estimating a current position of the vehicle;

an image capturing unit adapted for capturing, using the first camera, at the current position of the vehicle, a current image of a stationary physical object situated in surroundings of the vehicle;

a digital object identifying unit adapted for identifying a pre-stored mapped digital object to correspond to the stationary physical object;

a size determining unit adapted for determining a current size value of at least a portion of the stationary physical object in the current image;

a size comparing unit adapted for comparing the current size value to a pre-stored reference size value of a reference image pre-captured by the first camera comprising the predetermined characteristics, which reference size value is associated with the current vehicle position and the mapped digital object; and a re-evaluating unit adapted for re-evaluating the estimated current position of the vehicle based on an outcome of the comparing the current size value to the reference size value.

12. The vehicle positioning system according to claim 11 wherein the reference size value is further associated with a mapped position of the mapped digital object.

13. The vehicle positioning system according to claim 11 further comprising:

a positioning tuning unit adapted for tuning the estimated current position of the vehicle based on the outcome of the comparing; and/or a confidence level determining unit adapted for determining a confidence level value of the estimated current position of the vehicle, based on the outcome of the comparing.

14. The vehicle positioning system according to claim 11 further comprising a reference size updating unit adapted for updating the reference size value.

15. A vehicle comprising an object size mapping system according to claim 8.

16. A vehicle comprising a vehicle positioning system according to claim 11.

* * * * *